United States Patent
Perfido et al.

Patent Number: 5,588,600
Date of Patent: Dec. 31, 1996

[54] PROCESS AND APPARATUS FOR MAKING CRUMB RUBBER FROM VEHICLE TIRES

[76] Inventors: Kenneth F. Perfido, 12 Autumn Dr., Mount Sinai, N.Y. 11766; Anthony M. Cialone, 34 Carnation Ave., Floral Park, N.Y. 11001

[21] Appl. No.: 484,233

[22] Filed: Jun. 7, 1995

[51] Int. Cl.⁶ .............. B02C 19/12; B02C 23/08
[52] U.S. Cl. .......... 241/23; 241/24.17; 241/152.1; 241/DIG. 31; 241/DIG. 37
[58] Field of Search ............... 241/21, 23, 24, 241/DIG. 31, DIG. 37, 152.1, 24.17

[56] References Cited

U.S. PATENT DOCUMENTS

| | | | |
|---|---|---|---|
| 2,126,672 | 8/1938 | Smith et al. . | |
| 2,136,099 | 11/1938 | Buxbaum . | |
| 2,462,645 | 2/1949 | Knowland . | |
| 2,471,043 | 5/1949 | Schenck . | |
| 3,232,543 | 2/1966 | Pasteka . | |
| 3,364,526 | 1/1968 | Varady et al. . | |
| 3,384,309 | 5/1968 | Marshall . | |
| 3,718,284 | 2/1973 | Richardson . | |
| 3,923,256 | 12/1975 | Dörner . | |
| 3,931,935 | 1/1976 | Holman . | |
| 3,966,125 | 6/1976 | Finkbeiner | 241/14 |
| 3,995,816 | 12/1976 | Motek . | |
| 3,997,121 | 12/1976 | Motek . | |
| 4,025,990 | 5/1977 | Lovette, Jr. | 241/14 |
| 4,090,670 | 5/1978 | Bennett | 241/23 |
| 4,113,186 | 9/1978 | Smith . | |
| 4,240,587 | 12/1980 | Letsch | 241/23 |
| 4,273,294 | 6/1981 | Hollely et al. . | |
| 4,383,650 | 5/1983 | Contal et al. . | |
| 4,405,090 | 9/1983 | Wakeem . | |
| 4,428,535 | 1/1984 | Venetucci . | |
| 4,714,201 | 12/1987 | Rouse et al. . | |
| 4,726,530 | 2/1988 | Miller et al. . | |
| 4,757,949 | 7/1988 | Horton | 241/38 |
| 4,813,614 | 3/1989 | Moore et al. | 241/23 |
| 4,863,106 | 9/1989 | Perkel | 241/5 |
| 5,011,087 | 4/1991 | Richardson et al. . | |
| 5,024,386 | 6/1991 | Morris . | |
| 5,234,171 | 8/1993 | Fantacci . | |
| 5,299,744 | 4/1994 | Garmater | 241/19 |
| 5,368,240 | 11/1994 | Bonnet . | |
| 5,375,775 | 12/1994 | Keller et al. . | |
| 5,385,307 | 1/1995 | Azar | 241/41 |
| 5,390,861 | 2/1995 | Bishop . | |
| 5,411,216 | 5/1995 | O'Keefe . | |

*Primary Examiner*—John Husar
*Attorney, Agent, or Firm*—Scully, Scott, Murphy & Presser

[57] ABSTRACT

A process for recovering crumb rubber from used vehicle tires wherein the tires are comminuted in three comminuting operations, the second and third of which are prefaced by contact with a liquid cryogenic. The cryogenic liquid which is gassified upon contact with the tire particles, is reliquefied and recycled.

39 Claims, 3 Drawing Sheets

PROCESS AND APPARATUS FOR MAKING CRUMB RUBBER FROM VEHICLE TIRES

BACKGROUND OF THE DISCLOSURE

1. Field of the Invention

The present invention is directed to a process and apparatus for making crumb rubber from used automobile and truck vehicle tires. More particularly, the present invention is directed to a process and an apparatus of making vehicle tires which involves multiple cryogenic cooling of comminuted rubber particles wherein the cryogenic fluid is recycled.

2. Background of the Prior Art

The daunting number of used tires that must be disposed of annually has not only filled waste disposal sites but, unfortunately, has additionally resulted in indiscriminate discarding of tires creating a major environmental problem. It is for this reason that a great number of processes have been advanced for the disposal of tires in a manner that not only eliminates them as an environmental problem but provides a product that recovers some or all of the cost of such tire disposal.

In one type of disposal scheme a whole plurality of processes have been developed in which used tires are comminuted and the fuel value inherent in the significant volatile content of vehicle tires is recovered. More recently, processes which recover the rubber constituent of vehicle tires, for reuse in the manufacture of rubber-containing articles, have been developed.

Of particular interest are rubber recovery processes which involve the utilization of cryogenic fluids, usually very cold liquid and gaseous nitrogen, to permit the comminution of the tires into small solid particles without attendant melting or significant softening of the rubber.

Although the advance provided by cryogenic cooling of vehicle tires and rubber particles thereof advances the art insofar as it greatly increases the efficiency of the comminuting process, such processes are plagued by two major problems. The first such problem resides in the high cost of utilizing cryogenic fluids. Most of the processes that have been developed utilize fresh sources of cryogenic fluids which, after their employment in cooling and embrittling rubber, are vented to the atmosphere. This venting represents a complete surrender of that charge of the high cost cryogenic fluid.

A second related problem associated with prior art processes is the inability to produce fine sized rubber particles suitable for reuse in the manufacture of rubber articles. Those skilled in the art are aware that very finely divided rubber particles are essential if the crumb rubber product of tire comminution processes can be sold to rubber and rubber application manufacturers. This, in turn, may be the result of the absence of processes that cryogenically treat small enough particles so that they can be further comminuted to the requisite size required for commercial resale. Obviously, this absense may be the result of the expense associated of more than one cryogenic fluid contacting steps.

The above remarks can be better appreciated by reference to illustrative prior art processes which not only set forth the current state of the art but also emphasize their limitations.

U.S. Pat. No. 4,863,106 describes a process and apparatus for the low temperature comminution of tires which includes the recycle of the cryogenic fluid employed therein. In this process tires are shredded into smaller particles which are cooled by contact with a cryogenic gas. Indeed, the process of the '106 patent involves two cooling steps prior to first particlizing tire portions and thereafter comminuting rubber granules. That process also involves recycling the cryogenic cooling gas employed in the two cooling steps for reuse.

A problem associated with the process of the '106 patent is that the cooling gas used in this process cannot provide the degree of cooling necessary to permit the degree of comminution required to produce the fine sized particles essential for production of crumb rubber. In this absence the cost of removing tires from the environment cannot be recouped.

A second disclosure which provides a process and an apparatus for reducing rubber to particles is not particularly directed to the conversion of tires into crumb rubber. Rather, the process of this prior art reference concerns the comminution of scrap rubber, rather than whole tires, into fine sized rubber. It is true, of course, that the scrap rubber may be product of shredded vehicle tires. Be that as it may, U.S. Pat. No. 5,368,240 describes a process wherein rubber particles are loaded on an upwardly moving conveyor belt which is precooled by the vaporization product of a downstream cryogenic liquid bath. That is, the vapors emanating from a downstream cryogenic liquid are directed, by means of a conduit, upwardly by gravity to a precooling chamber. The precooled product of the upwardly moving precooling chamber is thereupon passed through a bath of a cryogenic liquid.

Although the process of the '240 patent avails itself of the vapor from a separately used cryogenic liquid that gas is ultimately vented. Furthermore, the first cooling step does not take particular advantage of the fact that there are two cryogenic fluid contacting cooling steps in that both cooling steps are associated with only one comminution step. The cryogenic gas precooling steps merely enhances the efficiency of the single cryogenic liquid contacting step.

The above illustrations of the prior art emphasize the need in the art for a process and an apparatus that combines a sufficient number of comminution steps preceded by cryogenic liquid cooling to ensure the formation of fine crumb rubber in a manner that insures that the costs and expenses associated conducting these cryogenic cooling steps does not make this process economically infeasible.

BRIEF SUMMARY OF THE INVENTION

A process and an apparatus has now been developed which provides adequate comminuting steps preceded by efficient cryogenic cooling such that crumb rubber of a size that can be utilized in rubber forming operations, and is thus commercially useful, is provided. At the same time, this process and apparatus minimizes the use of cryogenic fluids required to provide these efficient comminution operations. This is accomplished by novel cryogenic fluid recycle operations, consistent with the efficient contact of rubber particles prior to subsequent comminution, with a cryogenic liquid.

In accordance with the present invention a process for producing crumb rubber from vehicle tires is provided. In this process used vehicle tires are shredded to provide rubber particles which include embedded metal and fiber. These rubber particles are thereupon contacted with a cryogenic liquid. The thus cooled rubber particles are reduced in size and substantially all the metal and fiber embedded therein are removed. The substantially pure rubber particles are thereupon again contacted with a cryogenic liquid followed by reduction in particle size to produce the crumb rubber product.

In further accordance with the present invention an apparatus for producing crumb rubber from vehicle tires is set forth. In this apparatus a first comminuting means for shredding tires into rubber particles which include embedded ferrous metal and/or fiber is provided. A first cryogenic liquid contacting means cryogenically cools said rubber particles. A second comminuting means reduces the average particle size of the rubber particles cooled in the first cryogenic luqid contacting means. Fiber and ferrous metal removal means remove fiber and/or ferrous metal separated from said rubber particles in said second comminuting means. A second cryogenic liquid contacting means again cools the rubber particles which are substantially fiber- and ferrous metal-free. A third comminution means further reduces the average particle size of the rubber particles. Screening means are provided to separate the rubber particles which pass through the desired particle size screen required of crumb rubber.

BRIEF DESCRIPTION OF THE DRAWINGS

The present invention will be better understood with reference to the accompanying drawings of which.

DETAILED DESCRIPTION

Figure 1:
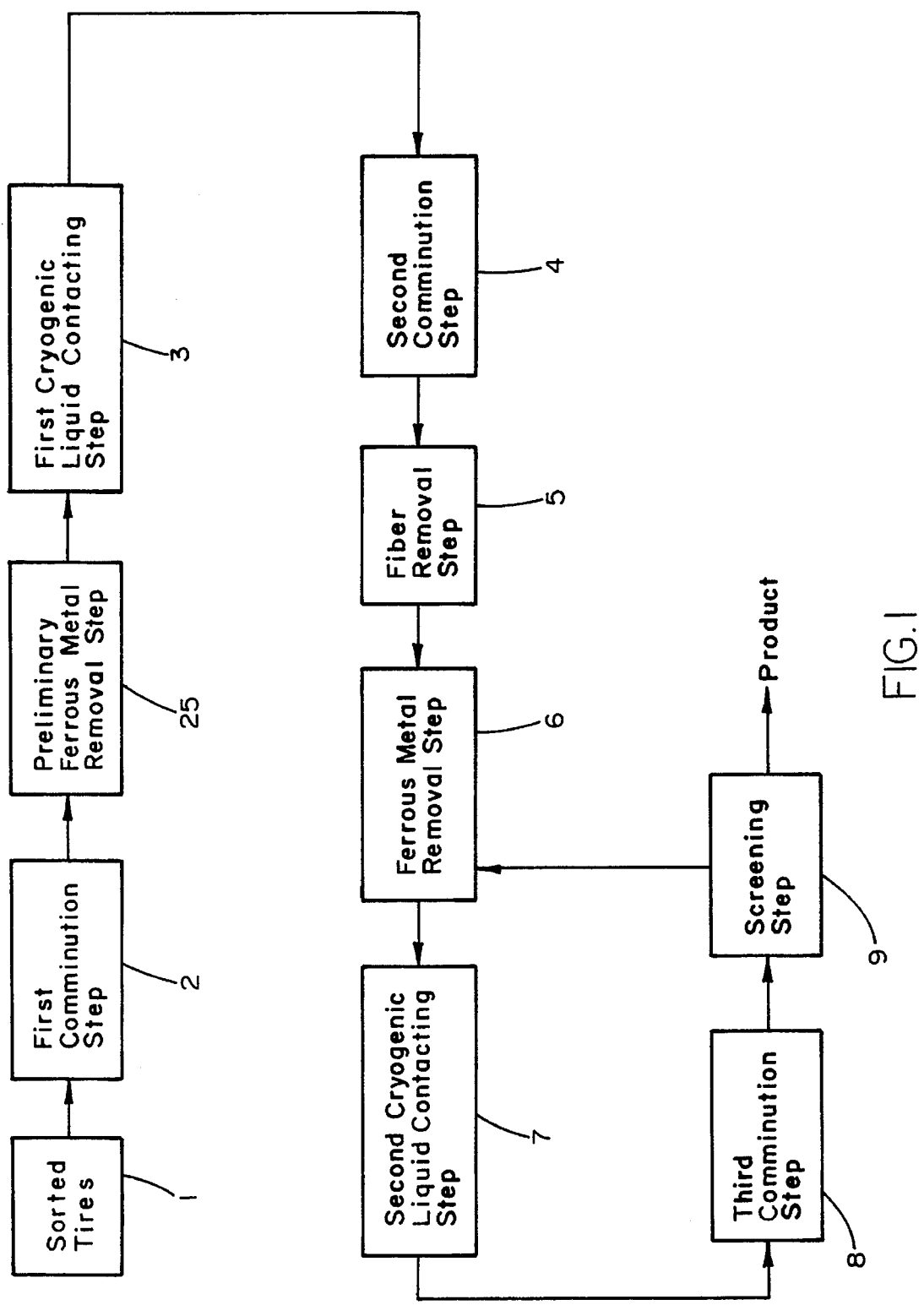
FIG. 1 is a schematic flow diagram of the process and apparatus of the present invention.

The process and apparatus of present invention begins with the introduction of a supply of used vehicle tires which may be automobile, truck or off the road tires. These tires are initially segregated to remove those tires which can be reused. That is, those tires that can be recapped, retreaded or reused are segregated for resale and reuse. This, of course, represents the most efficient use of the tire insofar as it not only permits reuse, creating an asset from an otherwise environmental liability, but it also provides the highest revenue based on its cost to the processor since it also eliminates processing of those tires in the process and apparatus of the present invention.

The remaining tires are further sorted to separate those tires that are not suitable for processing in the process and apparatus of making crumb rubber. Tires that are oxidized, heavily contaminated or merely whitewalled are unsuitable for crumb rubber production in the process and apparatus of the present invention.

These unacceptable tires are shredded to provide approximately one inch particles. It is emphasized that the nominal size reported above and hereinafter refers to the maximum length of the particle in any direction. Thus, the term "one inch particles" represents a particle which has a one inch diameter spherical shape, a one inch cubic shape or any geometric shape therebetween wherein the maximum dimension is approximately 1 inch.

These about 1 inch rubber particles, which may include embedded fibers and/or ferrous metal, are treated to remove loose ferrous metal. They are thereupon sold to industries wherein cheap sources of fuel are employed. Thus, such industries as, for example, the paper and pulp industry and the electric power industry which utilize furnaces that have the capability of burning almost any combustible material represent ready markets for this product.

Those tires which have not been selected for reuse, recapping or retreading but have been found suitable for processing to form crumb rubber represent the raw material of the crumb rubber process of the present invention. Even this group of vehicle tires, however, is subject to sorting and selective processing. Therefore, off the road tires, which are very large and heavy tires, are segregated from truck and automobile tires.

The off the road large size tires are debeaded and cut into manageable size by special heavy cutting apparatus such as a hydraulic shear. A large size cutting apparatus such as a basic scissor type hydraulic shear is required to cut these oversized and heavy tires into manageable pieces that can be handled by the comminuting apparatus used to shred automobile and truck tires. These thus cut off the road tires are subjected to the first comminuting step in accordance with the processing of the below discussed automobile and truck tires.

The remaining non-off the road tires suitable for processing in the crumb rubber process of this invention are sorted again to segregate automobile tires from truck tires. The larger and heavier truck tires are separated from the smaller and lighter automobile tires in order to more efficiently comminute them. Although both type of tires are subject to the same type of comminution process, in the same apparatus, the conditions under which the two processes take place varies in accordance with the above characteristics of the two types of tires. That is, both kinds of tires are subjected to a first comminuting step in a first comminuting means wherein the tires are converted into approximately 1 inch rubber particles embedded with fiber and/or ferrous metal. However, although the same equipment may be used in this initial comminution step, the first comminuting means is usually provided with varying cutting speeds. Automobile tires, being lighter, are subjected to faster shredding while truck and off the road tires, being heavier, are subjected to slower cutting speeds.

The approximately 1 inch rubber particles, in a preferred embodiment, are subject to a ferrous metal removal step in ferrous metal removal means to remove loose ferrous metal particles that are not firmly embedded in the approximately 1 inch rubber particles product of the first conninuting step.

The about 1 inch rubber particles are thereupon contacted with a cryogenic liquid in a first cryogenic liquid contacting means. The cryogenic liquid embrittles the particles such that they can easily be reduced in size by any of many rubber comminution reduction methods known in the art using well known comminution means. The chilling of the rubber particles insure that the particles, during size reduction, remain in the solid state; that the apparatus used to reduce particle size does not plug or reduce speed because of the formation of semi-molten or even highly viscous liquids; and that the wear and tear of the apparatus employed to reduce the size of the particles is minimized.

It is emphasized that the process and apparatus of the present invention involves direct contact between a cryogenic liquid and solid rubber particles. This method is more effective than cooling between solid rubber particles and a cryogenic gas. This is so in that conductive heat transfer efficiency resulting from direct contact between a cryogenic liquid and solid rubber particles is far more efficient than is the convective heat transfer between a cryogenic gas and solid rubber particles.

The thus cooled and embrittled particles are thereupon subject to a second comminution processing step wherein the particle size is reduced from about one inch in maximum dimension to rubber particles having a maximum dimension of approximately ¼ inch. Any of the well known comminuting means utilized as the second comminuting means to reduce rubber particle size may be utilized in this step. Thus, such apparatus as a grinder mill, an impact grinder, a hammer mill, a ball mill or the like may be utilized to effect this second comminution processing step.

With the rubber particles reduced to the relatively small size of approximately ¼ inch in maximum dimension substantially all of the embedded fiber and/or ferrous metal, utilized to reinforce and strengthen the tire, is separated from the rubber particles. Thus, these materials are separable at this stage in the process.

It is mentioned in passing that the separation of these two separate materials is not only essential in order to provide commercially viable crumb rubber, free of these materials, but these materials have a market of their own, albeit at a much lower price than that obtained for crumb rubber. Indeed, the necessary separation of these components are partially compensated for by the marketing of these products.

Fibers, which, as stated above, are often times present in vehicle tires, are substantially separated from the rubber particles in the second comminuting step, are removed by methods well known in the art. Preferably, this involves air classification wherein the fibers, having a lower density than the other solid comminution products, are separated therefrom, as will be discussed below.

Ferrous metal is also physically separated from the rubber particles in the second comminution step. This ferrous metal component is thereupon removed in a ferrous metal removal step by ferrous metal removal means. This removal is preferably accomplished by magnetic attraction of the metal from the rubber as in many processes of the prior art.

The substantially pure ¼ inch rubber particles are then subjected to a second contact with a cryogenic liquid. This second cryogenic liquid cooling step, employing second cryogenic liquid contacting means, is employed in order to again comminute the rubber particles to reduce their size directly to the particle size at which crumb rubber is commercially traded. That is, the second cryogenic cooling step is employed to efficiently embrittle the relatively small, about ¼ inch rubber particles such that they can be reduced further in size, in a third comminution step using a third comminution means, to the commercially desired crumb rubber size of −100 mesh, the size at which crumb rubber is sold.

It is important to appreciate that the comminution of rubber particles to a size sufficient to pass through a 100 mesh screen is not well known in the prior art. That is, the prior art processes of producing crumb rubber from vehicle tires produces only small concentrations of −100 mesh particles and thus requires a much greater vehicle tire throughput to attain commercially viable product yields.

The third comminution step of reducing the particle size of the rubber from a maximum dimension of about ¼ inch to rubber particles, the majority of which pass through a 100 mesh screen, again employs the same types of comminuting apparatus used in the second comminuting step of the process of this invention. Thus, grinder mills, impact grinders, hammer mills, ball mills and the like are usually utilized in effecting this comminution.

The product of this step is preferably screened to insure that only particles having a size passing through a 100 mesh screen are recovered. In a preferred embodiment, those rubber particles having a particle size that does not pass through the 100 mesh screen are recycled back to a stage in the process upstream of the second cryogenic liquid contracting step, more preferably to the step wherein the approximately ¼ inch rubber particles are subject to gerrous metal separation. That is, these oversized rubber particles are subject to ferrous metal particle removal followed by treatment again in the second cryogenic liquid contacting means.

In a preferred embodiment, to insure adequate separation of ferrous metal particles, which oftentimes are present in very small size, the −100 mesh crumb rubber product is again subjected to metal separation.

It is emphasized that the above discussion does not describe in detail a novel aspect of the process and apparatus of this invention, the cryogenic liquid contacting steps. These contacting steps represent a major advance in this art. This processing will be discussed below in detail. Suffice it to say, it permits recycling of the cryogenic fluids which, in the prior art, added significantly to the cost of processes for converting vehicle tires into crumb rubber.

To better appreciate the process of the present invention, attention is directed to FIG. 1 which schematically provides a flow diagram of the above-discussed process and apparatus. The process and apparatus begins with sorted tires, depicted at 1. These tires, as discussed below, are those that remain after removal of the reusable, retreadable or recappable tires present in any shipment of tires provided for processing in accordance with the process of the present invention.

Figure 3:
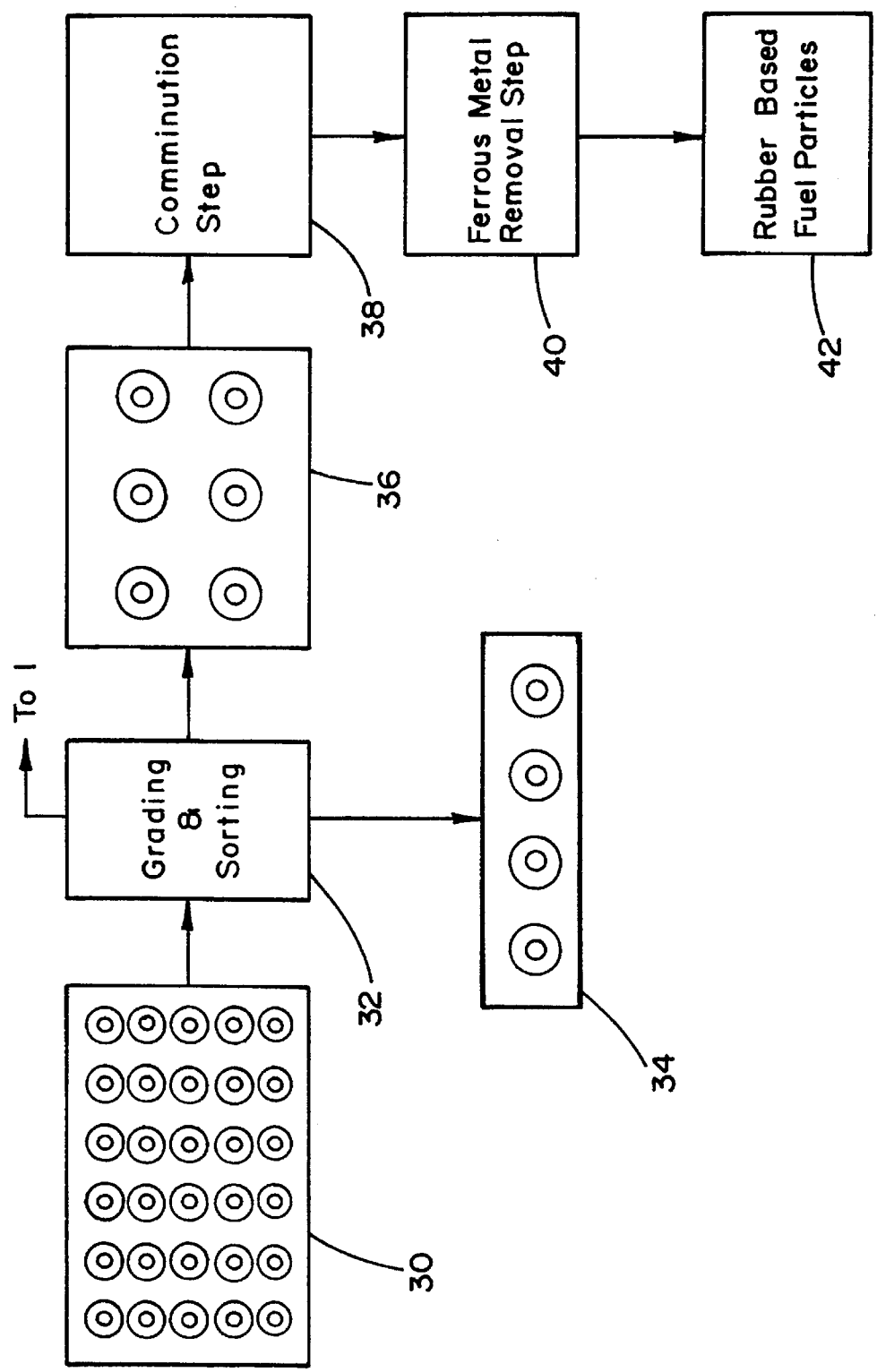
FIG. 3 is a flow diagram of the vehicle tire presorting aspect of the process and apparatus of the present invention.

The sorted tires 1 also exclude the tires which are not processable in the process and apparatus of the present invention of producing crumb rubber from vehicle tires. The processing of these tires is illustrated in FIG. 3. As illustrated therein, tires that are oxidized, contaminated, whitewalled or are otherwise not processable into crumb rubber are graded and sorted, in operation 32, from a random delivery of used vehicle tires 30, to sort out crum rubber nonprocessable tires 36. It is therein noted that the grading and sorting step 32 also involves the removal of reusable, recappable or retreadable tires 34 for reuse by appropriate vendors. The tires appropriate for use in the crumb rubber-producing process and apparatus of the present invention are denoted by "To 1." As discussed above, reference numeral 1 is representative of the sorted tires processable in the crumb rubber process and apparatus of the present invention. The remaining tires, tires that are oxidized, seriously corroded, seriously contaminated with excess dirt and foreign materials, whitewall tires or are in any other way unsuitable for recovery of the rubber content of tires, are within the contemplation of tires denoted by reference numeral 36.

The rubber content of the tires 36 have their greatest commercial value as fuel in large furnaces used in industries discussed above. These tires are initially processed as in the first comminution step of the process and apparatus employed to produce crumb rubber. That is, tires 36 are is subjected to a comminuting step 38. In a preferred embodiment of this process the tires are shredded in accordance with the procedure utilized in the first comminuting step of the below discribed process and apparatus for making crumb rubber. Thus, all the remarks made regarding the first comminuting step of the process of making crumb rubber apply to the step denoted at 38.

The product of comminuting step 38 is rubber particles whose longest dimension in any direction is approximately 1 inch. These rubber particles include embedded ferrous metal and/or fibers. The embedded fiber and ferrous metal is not removed. However, any loose ferrous metal is removed, as indicated at 40. The removal of loose ferrous metal by ferrous metal removal means is accomplished by transporting the approximately one inch rubber particles beneath a belt magnet moving normally to the direction of the conveyor belt moving the about one inch rubber particles from the comminution means. Loose ferrous metal is drawn upward onto the cross belt magnet which removes it from the rubber particles. The resultant product, about 1 inch rubber particles which include embedded fiber and metal, is depicted at 42. This product is employed as fuel in processes which require low cost energy for commercial applicability, such as paper and pulp manufacture and electrical generation.

Returning to the crumb rubber process and apparatus, the whole tires 1 suitable for the crumb rubber processing, are conveyed to a first comminuting step 2. Therein, the whole tire is converted to particles having a maximum dimension of about 1 inch and include therein embedded ferrous metal and/or fibers. As stated above, off the road tires, which represent a small minority of the tires processed in accordance with the process and apparatus for making crumb rubber are subject to debeading and shredding by a hydraulic shear, preferably a scissor type hydraulic shear. This results in cutting these very large tires to a size equivalent to the average automobile or truck tire.

These so sheared, off the road tires, along with automobile and truck tires, are comminuted in a first comminution step 2 employing a first comminution means that shreds the tire into particles having a maximum dimension of about 1 inch.

In a preferred embodiment, the first comminuting means employed in the first comminuting step 2 is provided by a shearing apparatus. A preferred shearing apparatus is a shredder provided with a multiplicity of cutting knives attached to one or more shafts which rotate in a chamber into which the vehicle tires are charged. The shafts, in a particularly preferred embodiment, are rotated at at least two variable speeds so that maximum efficiency is obtained. That is, a load of truck tires are comminuted by rotating the shafts carrying the multiplicity of cutting knives at a low speed. On the other hand, a load of automobile tires is charged into the shredder wherein the shafts rotate at a higher rotational velocity.

In a particularly preferred embodiment of the process and apparatus of this invention, a Columbus McKinnon [trademark] shredder equipped with 336 stainless steel cutting knives per shaft is utilized. The shredder may be provided with a classifying system which separates and recycles oversized particle chips for further comminution. A fine water mist may be sprayed into the cutting chamber of the shredder to assist in lubricating the knives in their cutting action. This water spray is adjustable in terms of pressure and flow rate. It is preferred that the water be recirculated by means well known in the art.

It is to be appreciated that means may be provided to convey the vehicle tires 1 to the first comminution step 2. Thus, tires selected for use in step 1 are conveyed to the first comminuting step 2 by such apparatus as an inclined feed conveyer which moves the tires 1 upward to the top end of the first comminution means of first comminuting step 2.

The product of the first comminution step 2, rubber particles which include embedded ferrous metal and/or fibers having a maximum dimension size of about 1 inch, are transported to the next step of the process and apparatus, a first cryogenic liquid contacting step 3 by means known in the art. A preferred method of conveyance is a discharge conveyor wherein the about 1 inch rubber particles product of the first comminution step 2 is disposed. The discharge conveyor transmits the approximately 1 inch rubber particles onto a feeding conveyor which transports the approximately 1 inch rubber particles to a first cryogenic liquid contacting means wherein first cryogenic liquid contacting step 3 occurs. Because of the importance of the cryogenic liquid contacting steps, the first cryogenic liquid contacting step 3 is discussed below in detail.

Before discussing cryogenic liquid contacting step 3, it should be appreciated that an optional step may be provided. That is, loose ferrous metal, not embedded in the about 1 inch rubber particles, may be removed in a preliminary ferrous metal removal step 25. The preliminary ferrous metal removal means, the apparatus employed in step 25, is preferably an apparatus that takes advantage of magnetic forces to separate loose ferrous metal from the about 1 inch rubber particles. More specifically, a cross belt magnet of the type described above in the description of the processing of tires used as fuel, is employed.

Figure 2:
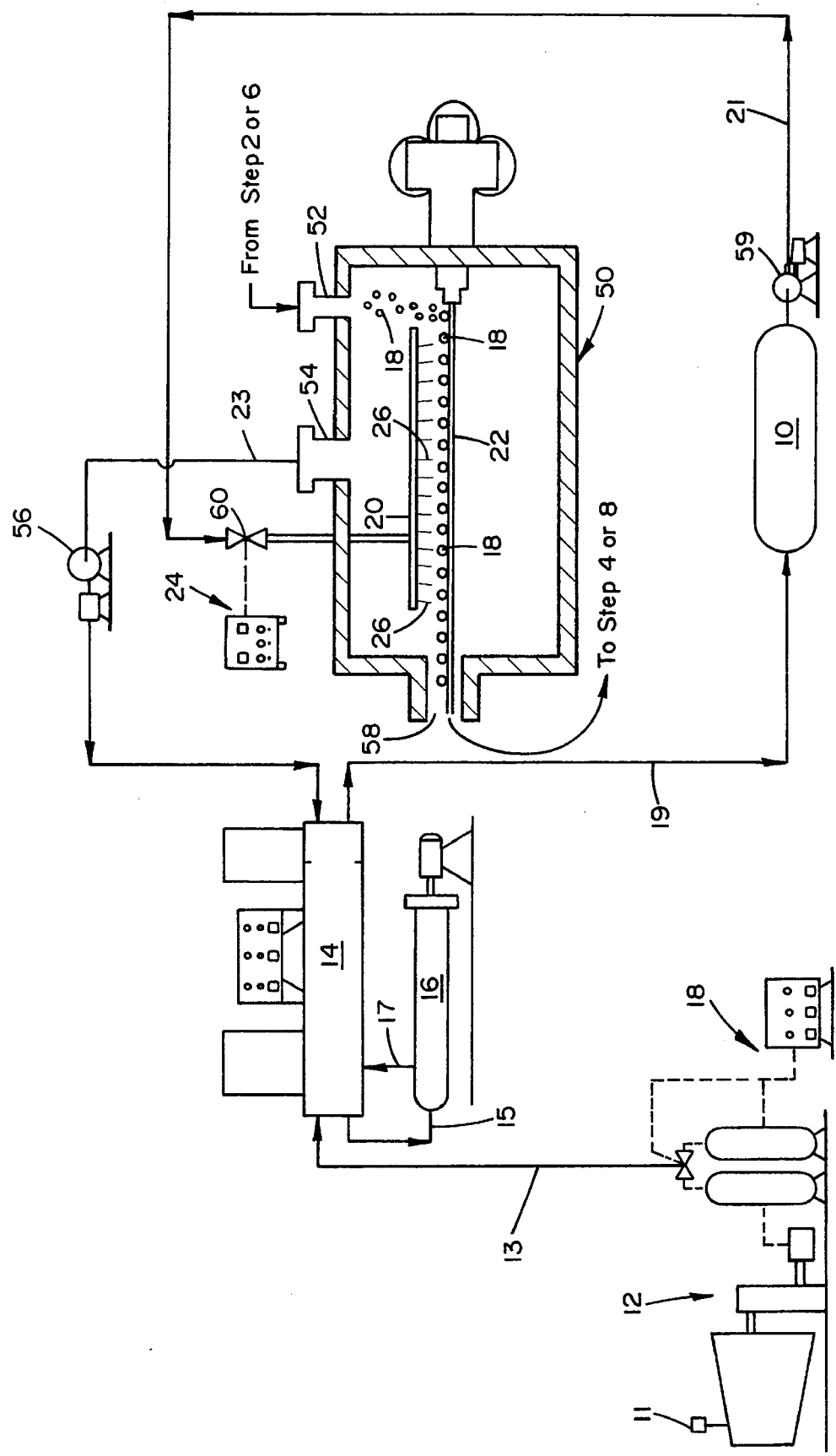
FIG. 2 is a detailed flow diagram of the cryogenic fluid recycle aspect of the process and apparatus of the present invention.

Returning to the discussion of the first cryogenic liquid contacting step 3 attention is directed to FIG. 2 wherein a cryogenic cooling tunnel, generally indicated at 50, is depicted. The approximately one inch rubber particles with embedded fibers and/or ferrous metal, denoted at 18, are discharged from means provided for introduction into the tunnel 50, preferably an infeed conveyor belt, through inlet 52 and dumped by gravity feed onto a conveyor belt 22. Whereas the conveyor belts discussed above may be plastic, such as polyvinyl chloride, it is preferred that the conveyor belt 22 be metallic, preferably stainless steel. The belt may be adjusted to any desired speed. Suffice it to say, the belt 22 is wide enough so that the rubber particles 18 disposed thereon are all exposable to a cryogenic liquid as will be discussed below. The belt 22 moves at a speed sufficient to provide adequate, but not excessive, contact with the cryogenic liquid. In one preferred embodiment the conveyor moves at a speed of about 60 feet per minute.

A cryogenic liquid 26, which may be liquid nitrogen, liquid argon, liquid helium or other inert gas which is a liquid at cryogenic temperatures, is showered over the particles 18 by means of manifold 20. Of the cryogenic liquids useful in this application, liquid nitrogen, because of its low temperature at atmospheric pressure, its relative low cost compared to other cryogenic liquids and its inertness is preferred.

Contact with the cryogenic liquid 26 by particles 18 results in the rubber particles being cooled to a temperature, as they leave the tunnel 50, in the range of between about $-220°$ C. to $-150°$ C. Preferably, the temperature of the particles leaving tunnel 50 is in the range of between about $-200°$ C. and about $-160°$ C. More preferably, the particles exit tunnel 50 at a temperature in the range of between about $-175°$ C. and about $-165°$ C.

A unique feature of the present invention involves the recovery of the cryogenic fluid. Thus, the cryogenic liquid 26, preferably liquid nitrogen, is heated by contact with rubber particles 18 with the result that the latent and sensible heat imparted to the liquid 26, which as stated above is preferably liquid nitrogen, is vaporized to form gaseous nitrogen. The gaseous nitrogen escapes through vent 54 and travels, under the pressure provided by pump 56, through conduit 23. This gaseous nitrogen, at a temperature in the range of between about $-140°$ C. to about $-125°$ C., is directed through conduit 23 into a liquefier cold box 14.

Therein the gaseous cryogenic, usually gaseous nitrogen, at the aforementioned temperature range of about −140° C. to about −125° C. is chilled and condensed to liquid nitrogen at a temperature in the range of between about −200° C. to about −190° C. The liquid nitrogen exiting the cold box 14 is directed, by means of conduit 19, into a cryogenic liquid storage dewar 10.

Although attempts are made to eliminate loss, it is virtually impossible to prevent a certain fraction of the cryogenic gas, usually gaseous nitrogen, from escaping during the above described transit. Thus, make up nitrogen is provided by means of a air separation system wherein air 11 is drawn into a standard air separation unit 12, under computer control 18, such that the nitrogen portion of the separated air stream is conveyed, by means of conduit 13, into liquifier cold box 14. The nitrogen gas is therein cooled and exits the box 14 through conduit 15 into a refrigeration compressor 16. The resultant high pressure gaseous nitrogen product of this compression step exits through conduit 17 back into nitrogen liquifier cold box 14 wherein it is liquefied and added to the liquid nitrogen stream that flows back into dewar 10 through conduit 19.

Liquid nitrogen or other liquid cryogenic stored in dewar 10 is conveyed back into the tunnel 50 through conduit 21 under the pressure provided by pump 59. The cryogenic liquid in conduit 21 is under automatic control as depicted in the drawing by control means 24 which regulates the flow of liquid nitrogen 26 into manifold 20 by means of control valve 60.

Returning now to the overall process, the chilled rubber particles 18 leaving the conveyor belt 22 exit through outlet 58. These particles are thereupon directed into a second comminuting step 4. In this comminuting step the rubber particles are reduced in size to about ¼ inch rubber particles. The second comminuting means, the apparatus utilized to further reduce the size of the rubber particles to approximately ¼ inch, is any one of the well known apparatus known in the art for comminuting solid particles. Thus, any one of the comminuting apparatus known in the art such as a grinder mill, an impact grinder, a hammer mill, a ball mill or the like may be employed. In a preferred embodiment of the apparatus of the present invention, the second comminuting means 4 is a grinder mill.

A particularly preferred grinder mill is an Excalibur [trademark] rubber crumb mill wherein the particles are crushed between rollers rotating, under the power provided by a 250 hp motor, at a rotational speed of about 1400 rpm.

Not only does second comminuting step 4 reduce the rubber particle size closer to the size of commercial crumb rubber but it also substantially separates the fiber and/or ferrous metal particles embedded in the larger sized rubber particles that are charged into the second comminuting means. That is, the reduction in size of the rubber particles from approximately 1 inch to about ¼ inch substantially separates the rubber particles from fiber and/or ferrous metal particles. This separation provides the means for removing fiber and ferrous metal from the desired crumb rubber.

The first of these separations is preferably the removal of fiber particles denoted at 5. These fiber particles may be any of fibers used to reinforce vehicle tires such as synthetic organic polymer fibers, i.e. polyamide or polyester fibers, natural fibers, i.e. rayon fibers, glass fibers and the like. All of these reinforcing fibers have a density less than rubber. As such, fiber removal means preferably comprises a fluidizing air stream. Specifically, in a preferred embodiment, solid particles, which includes rubber, fiber and ferrous metal particles, are disposed on a conveyor belt and air is injected perpendicular to the direction of the conveyor belt flow. The fibers being the lightest solid, are disposed above the rubber and ferrous metal particles in this fluidized condition. An air knife, placed directly across the fluidized stream, permits collection of the fibers particles. These particles are collected for sale or disposal. An example of such a preferred fiber removal means is a Rader [trademark] low pressure air knife.

In a further preferred embodiment, the substantially fiber-free solid particles are subjected to a ferrous metal removal step 6. In a preferred embodiment, ferrous metal removal means employed in step 6, is accomplished by magnetic removal of the ferrous metal particles. More preferably, this magnetic ferrous metal removal is carried out by disposing a cross belt magnet over the fiber-free rubber particles which are disposed on a conveyor belt. The conveyor carrying the fiber-free rubber particles is disposed below the cross belt magnet and moves in a direction perpendicular to the cross belt magnet. One preferred cross belt magnet apparatus usable as the ferrous metal removal means is an Eriez [trademark] cross belt magnet.

The ferrous metal particles are collected by the ferrous metal removal means are released into a discharge shute in communication with a container used to collect the ferrous metal. This metal is sold.

The resultant substantially fiber- and ferrous metal-free, approximately ¼ inch rubber particles are then subjected to second cryogenic liquid contacting step 7. Second cryogenic liquid contacting step 7, in a preferred embodiment, is substantially identical to first cryogenic liquid contacting step 3. Thus, it is conducted in a tunnel which may be identical to the tunnel 50 utilized in the first cryogenic liquid contacting step 3. Moreover, it utilizes the same cryogenic recycle scheme discussed above and depicted in FIG. 2. Indeed, in a preferred embodiment, the nitrogen gas makeup stream system, as well as the liquid nitrogen storage and recycle system are common to both cryogenic liquid contacting steps 3 and 7. That is, a single liquid nitrogen dewar 10 is employed to feed liquid nitrogen into the tunnels utilized in both first and second cryogenic liquid contacting steps 3 and 7. Obviously, the use of a common system enhances the already efficient cryogenic fluid recycle scheme of the process and apparatus of the present invention and further increases the overall efficiency of the process and apparatus of this invention.

The product of the second cryogenic liquid contacting step 7, preferably exiting the operation at approximately the same temperature as the approximately ¼ inch particles leaving the first liquid cryogenic contacting step 3, i.e. between about −220° C. and about −150° C., preferably, between about −200° C. and −160° C. and more preferably, between about −175° C. and −165° C., is subjected to a third comminuting step 8.

As in the second comminuting step 4, the third comminuting means, used therein, may be any of the well known comminuting apparatus used to reduce the size of solid particles. Again, preferred methods of conducting this comminuting step 8 include subjecting the cold and embrittled approximately ¼ inch rubber particles to a third comminuting means in the form of a grinder mill, an impact grinder, a hammer mill, a ball mill or the like. As in the second comminuting step 4, a grinder mill such as an Excalibur [trademark] rubber crumb mill, is particularly preferred for use in step 8.

The product of the third comminuting step 8 is thereupon subjected to a screening step 9. The screening step 9 involves screening and separation of the very fine rubber particle product of the third comminuting step 8. In this screening step 9 the rubber particle product of the third comminuting step is processed in a screening means. In a preferred embodiment the screening means involves passing the particles over a 100 mesh screen. The particles that pass through this screen, denoted in the art as "–100 mesh" particles, represent the crumb rubber product of this process.

In a preferred embodiment of this screening step 9, the screening means is provided by a triple level layer screener. It is, furthermore, preferred that the screening means be provided with drying means so that coagulation of the particles does not occur.

A screening means, which provides the preferred advantages of the desired screening means, is a Rader [trademark] triple level screener powered by a 15 hp motor.

The rubber particles that do not pass through the 100 mesh screen in screening step 9 are recycled upstream of second cryogenic contacting step 7. That is, these particles are conveyed to the conveyor that moves the fiber-free ¼ inch particles to second cryogenic liquid contacting step 7. Since metal removal step 6 preferably occurs just upstream of second cryogenic liquid contacting means, the recycled particles are again subjected to metal removal step 6.

It is emphasized, however, that the efficient nature of the instant process preferably results in approximately 75% by weight of the rubber particles leaving the third comminution step 8 passing through the 100 mesh screens of the screening means of screening step 9 to produce the final crumb rubber product.

This final crumb rubber product, the –100 mesh rubber particles, in a preferred embodiment, are discharged onto conveyor belts whose pulleys are drum magnets. This final optional step is employed to remove any remaining fine metal particles. Thus, the degree of purity of the crumb rubber –100 mesh product is very high, meeting all requirements imposed by users of crumb rubber in terms of allowable concentrations of foreign materials such as fibers and ferrous metals.

The above embodiments and illustrations are given to exemplify the scope and spirit of the present invention. These embodiments and illustrations will make apparent, to those skilled in the art, other embodiments and illustrations. These other embodiments and illustrations are within the contemplation of the present invention. Therefore, the present invention should be limited only by the appended claims.

What is claimed is:

1. A process for recovering crumb rubber from vehicle tires comprising:
   (a) shredding vehicle tires to provide rubber particles which include embedded fiber and/or ferrous metal;
   (b) contacting said rubber particles produced in step (a) with a cryogenic liquid wherein said rubber particles are chilled and cryogenic liquid vaporized;
   (c) collecting and conveying said cryogenic fluid utilized in step (b) to a cryogenic reliquefaction means;
   (d) reducing the particle size of said particles treated with said cryogenic liquid in step (b);
   (e) removing substantially all of said fiber and said ferrous metal from said product of step (d) whereby fiber- and ferrous metal-free rubber particles are produced;
   (f) contacting said rubber particles produced in step (e) with a cryogenic liquid wherein said rubber particles are cooled and cryogenic liquid is vaporized;
   (g) collecting and conveying said cryogenic fluid product of step (f) to said cryogenic reliquefaction means;
   (h) reducing the size of said cryogenic liquid-contacted rubber particles produced in step (f);
   (i) recycling Cryogenic liquid reliquefied in said cryogenic reliquefaction means to steps (b) and (f) for reuse therein; and
   (j) screening said rubber particles produced in step (h) and recovering a crumb rubber product.

2. A process in accordance with claim 1 wherein said cryogenic liquid is liquid nitrogen and said vaporized cryogenic liquid is gaseous nitrogen.

3. A process in accordance with claim 2 including the step of conveying said liquid nitrogen product of said gas cryogenic reliquefaction means to a liquid nitrogen storage dewar prior to recycling of said liquid nitrogen for reuse in steps (b) and (f).

4. A process in accordance with claim 3 including the step of separating air to produce nitrogen gas in sufficient amount to make up for lost nitrogen gas in said steps (c) and (g).

5. A process in accordance with claim 4 wherein said nitrogen gas obtained in said air separation process is conveyed to said nitrogen liquefaction facility wherein said nitrogen gas is converted into liquid nitrogen and recycled into said liquid nitrogen storage dewar.

6. A process in accordance with claim 1 comprising a first step of sorting and grading an original supply of vehicle tires prior to step (a) to remove and recover reusable, recappable and/or retreadable tires.

7. A process in accordance with claim 6 including a second sorting step, prior to step (a), of removing tires not processable in the formation of crumb rubber.

8. A process in accordance with claim 7 wherein said unprocessable tires are selected from the group consisting of whitewall vehicle tires, oxidized vehicle tires and contaminated vehicle tires.

9. A process in accordance with claim 7 wherein said tires unprocessable to crumb rubber are processed for use as a fuel.

10. A process in accordance with claim 1 wherein the product of step (a) is rubber particles embedded with fiber and/or ferrous metal and fiber having a maximum dimension of no more than about one inch.

11. A process in accordance with claim 10 wherein said product of step (a) is subjected to the step of removing loose ferrous metal prior to said step (b).

12. A process in accordance with claim 1 wherein said step (d) produces rubber particles embedded with fibers and/or ferrous metal having a maximum dimension of no more than about ¼ inch.

13. A process in accordance with claim 11 wherein said rubber particles leaving said step (b) are at a temperature no higher than about –150° C.

14. A process in accordance with claim 1 wherein the removal of fibers in said step (e) is effected by air classification.

15. A process in accordance with claim 14 wherein removal of ferrous metal from said rubber particles in said step (e) occurs by magnetic removal of ferrous metal from said fiber-free rubber particles.

16. A process in accordance with claim 1 wherein said rubber particles exit said step (f) at a temperature of between about –220° C. and about –150° C.

17. A process in accordance with claim 1 wherein said step (h) results in particles having a size such that about 75% by weight, based on the total weight of the particles, pass through a 100 mesh screen.

18. A process in accordance with claim 17 wherein said screening operation of step (j) results in separating rubber particles having a size such that they pass through a 100 mesh screen as said crumb rubber product and recycling said rubber particles that do not pass through said 100 mesh screen back upstream of said step (f).

19. A process in accordance with claim 18 wherein said particles passing through said 100 mesh screen are subject to magnetic separation wherein fine metal particles are removed.

20. A process of making crumb rubber from vehicle tires comprising the steps of:
  (a) comminuting presorted automobile and truck tires to produce about one inch rubber particles embedded with ferrous metal and/or fibers;
  (b) showering said about one inch rubber particles with liquid nitrogen from a liquid nitrogen dewar in communication with a nitrogen liquefaction facility in a first liquid nitrogen contacting step wherein said particles are reduced to a temperature in the range of between about −220° C. and about −150° C. and wherein said liquid nitrogen is heated to a gaseous state;
  (c) cycling said gaseous nitrogen to said nitrogen liquefaction facility;
  (d) reducing the size of said rubber particles exiting said step (b) in a second comminution step, such that the particles have a maximum diameter of about ¼ inch and said fibers and said ferrous metal is separated from said rubber particles;
  (e) removing fibers from said about ¼ inch rubber particles, wherein said rubber particles are substantially fiber-free;
  (f) removing ferrous metal particles from said substantially fiber-free rubber particles wherein said particles are substantially fiber- and ferrous metal-free;
  (g) showering said about ¼ inch fiber- and metal-free rubber particles with liquid nitrogen obtained from said liquid nitrogen dewar in a second cryogenic contacting step wherein said particles are cooled to a temperature in the range of between about −220° C. and about −150° C. and said liquid nitrogen is heated to the gaseous state;
  (h) cycling said gaseous nitrogen to said nitrogen liquefaction facility;
  (i) reducing the size of said rubber particles processed in step (g) in a third rubber comminution step to a size such that a major amount of said particles pass through a 100 mesh screen; and
  (j) screening said rubber particles through a 100 mesh screen wherein a crumb rubber product of particles passing therethrough is obtained.

21. An apparatus for making crumb rubber from used vehicle tires comprising:
  (a) first comminuting means for shredding vehicle tires into rubber particles which include embedded fiber and/or ferrous metal;
  (b) first cryogenic liquid contacting means for cryogenically cooling said rubber particles with a cryogenic liquid;
  (c) first conveying means for conveying the gas-containing cryogenic fluid product of step (b) to a cryogenic gas reliquefaction means;
  (d) second comminuting means for reducing the particle size of said cryogenically cooled rubber particles produced in step (b);
  (e) fiber and ferrous metal removal means for removing fiber and ferrous metal particles separated from said rubber particles in step (d);
  (f) second cryogenic liquid contacting means for cryogenically cooling said fiber- and ferrous metal-free rubber particles produced in step (e);
  (g) second conveying means for conveying the cryogenic fluid product of step (f) to said cryogenic gas reliquefaction means;
  (h) third comminuting means for further reducing the average particle size of said cryogenically cooled rubber particles produced in step (f);
  (i) said cryogenic gas reliquefaction means for liquefying said gas-containing cryogenic fluid product of steps (b) and (f);
  (j) communication means for conveying said cryogenic liquid from said cryogenic gas liquefaction means to said first and said second cryogenic liquid contacting means; and
  (k) screening means for screening said rubber particles produced in step (h) wherein a crumb rubber product is recovered.

22. An apparatus in accordance with claim 21 wherein said fiber removal means, disposed downstream of said second comminuting means, comprises an air knife which removes said fibers from the fluidized particles product of said second comminuting means.

23. An apparatus in accordance with claim 21 wherein said ferrous metal removal means is disposed downstream of said fiber removal means and comprises a cross belt magnet which moves above and perpendicular to said fiber-free rubber particles.

24. An apparatus in accordance with claim 21 wherein said first comminuting means comprises a shredder which includes a plurality of cutting knives disposed on at least one rotating shaft enclosed in a chamber, said shaft rotatable at more than one rotational velocity wherein tires charged in said shredder are comminuted to about 1 inch rubber particles in which fibers and/or ferrous metal may be embedded.

25. An apparatus in accordance with claim 21 wherein said first cryogenic liquid contacting means includes a cryogenic cooling tunnel provided with a rubber particles inlet means in communication with a conveyor upon which said rubber particles are deposited, said conveyor moving said rubber particles under a manifold, in communication with a source of said cryogenic liquid, wherein said cryogenic liquid is showered on said rubber particles, and thereafter to a cryogenic cooling tunnel outlet means.

26. An apparatus in accordance with claim 25 wherein said cryogenic liquid is liquid nitrogen and wherein said cryogenic cooling tunnel includes gaseous nitrogen outlet means for removal of said gaseous nitrogen product of said liquid nitrogen contact with said rubber particles.

27. An apparatus in accordance with claim 21 wherein said second cryogenic liquid contacting means includes a cryogenic cooling tunnel provided with a rubber particles inlet means in communication with a conveyor upon which said rubber particles are deposited, said conveyor moving said rubber particles under a manifold, in communication with a source of said cryogenic liquid, wherein said cryogenic liquid is showered on said rubber particles, and thereafter to a cryogenic cooling tunnel outlet means.

28. An apparatus in accordance with claim 27 wherein said cryogenic liquid is liquid nitrogen and wherein said cryogenic cooling tunnel includes gaseous nitrogen outlet means for removal of said gaseous nitrogen product of said liquid nitrogen contact with said rubber particles.

29. An apparatus in accordance with claim 21 wherein said second comminuting means comprises a comminuting means selected from the group consisting of a grinder mill, an impact grinder, a hammer mill and a ball mill.

30. An apparatus in accordance with claim 29 wherein said second comminuting means is an impact grinder wherein cooled, about 1 inch rubber particles entering said second comminuting means are reduced in size therein to about ¼ inch rubber particles.

31. An apparatus in accordance with claim 21 wherein said third comminuting means comprises a comminuting means selected from the group consisting of a grinder mill, an impact grinder, a hammer mill and a ball mill.

32. An apparatus in accordance with claim 31 wherein said third comminuting means is an impact grinder wherein cooled, about ¼ inch rubber particles are reduced in size therein to about −100 mesh particles.

33. An apparatus in accordance with claim 21 wherein said screening means comprises a triple level screener in which said rubber particles exiting said third comminuting means are passed, the particles passing therethrough being −100 mesh crumb rubber product.

34. An apparatus in accordance with claim 33 wherein said particles not passing through said screening means are recycled upstream of said second cryogenic liquid contacting means.

35. An apparatus in accordance with claim 21 including a preliminary ferrous metal removal means, disposed downstream of said first comminution means, wherein loose ferrous metal not embedded in said rubber particles product of said first comminuting means are removed.

36. An apparatus in accordance with claim 35 wherein said preliminary ferrous metal removal means is a cross belt magnet moving over and perpendicular to the movement of said particles leaving said first comminuting means.

37. An apparatus in accordance with claim 21 including recycle means for conveying said cryogenic liquid formed in step (b) to a cryogenic liquid dewar and from there to said first and said second cryogenic liquid contacting means.

38. An apparatus in accordance with claim 37 wherein said cryogenic liquid and said vaporized cryogenic fluid is liquid nitrogen and nitrogen gas, respectively.

39. An apparatus in accordance with claim 38 including an air separation system for separating gaseous nitrogen from air, said air separation system in communication with said cryogenic gas reliquefaction means, whereby makeup nitrogen gas is provided thereto.

* * * * *